United States Patent
Simonpietri et al.

(10) Patent No.: US 12,157,863 B2
(45) Date of Patent: Dec. 3, 2024

(54) PROCESSING AND GASIFICATION OF CONSTRUCTION AND DEMOLITION MATERIALS

(71) Applicant: Simonpietri Enterprises LLC, Kailua, HI (US)

(72) Inventors: Marie-Joelle Simonpietri, Kailua, HI (US); Zachary Wadas, Kailua, HI (US)

(73) Assignee: SIMONPIETRI ENTERPRISES LLC, Kailua, HI (US)

( * ) Notice: Subject to any disclaimer, the term of this patent is extended or adjusted under 35 U.S.C. 154(b) by 0 days.

(21) Appl. No.: 18/050,950

(22) Filed: Oct. 28, 2022

(65) Prior Publication Data

US 2023/0132767 A1 May 4, 2023

Related U.S. Application Data

(60) Provisional application No. 63/273,589, filed on Oct. 29, 2021.

(51) Int. Cl.
| | |
|---|---|
| *C10J 3/78* | (2006.01) |
| *C01B 3/02* | (2006.01) |
| *C10K 1/00* | (2006.01) |

(52) U.S. Cl.
CPC ............ *C10J 3/78* (2013.01); *C01B 3/02* (2013.01); *C10K 1/007* (2013.01); *C01B 2203/04* (2013.01); *C10J 2300/0906* (2013.01); *C10J 2300/092* (2013.01); *C10J 2300/0946* (2013.01); *C10J 2300/1696* (2013.01)

(58) Field of Classification Search
CPC .............. C10J 3/78; C10J 2300/092; C10J 2300/0946; C10J 2300/1696; C01B 3/02
See application file for complete search history.

(56) References Cited

U.S. PATENT DOCUMENTS

| | | | |
|---|---|---|---|
| 4,400,181 A * | 8/1983 | Snell ..................... | C10J 3/78 48/197 R |
| 5,134,944 A | 8/1992 | Keller | |
| (Continued) | | | |

FOREIGN PATENT DOCUMENTS

| | | |
|---|---|---|
| CN | 103589475 A | 2/2014 |
| EP | 4086328 A1 * | 11/2022 |
| (Continued) | | |

OTHER PUBLICATIONS

Machine Translation of JP-2003327974-A (May 14, 2024) (Year: 2024).*

(Continued)

*Primary Examiner* — Matthew J Merkling
(74) *Attorney, Agent, or Firm* — Perkins Coie LLP

(57) ABSTRACT

Methods and systems for processing construction and demolition (C&D) materials to produce a product gas stream and/or electricity are disclosed herein. In some embodiments, the method comprises pre-processing C&D materials to produce a C&D feed, and processing the C&D feed to produce syngas. The C&D feed can comprise untreated wood, treated wood, paper and cardboard, yard waste, plastic, rubber, and/or foam. Processing the C&D feed can comprise gasifying the C&D feed, steam, and oxygen in a gasifier at a temperature of no more than 950° C. and/or a pressure of no more than 200 psi to produce syngas.

15 Claims, 10 Drawing Sheets

(56) References Cited

U.S. PATENT DOCUMENTS

| | | | | |
|---|---|---|---|---|
| 6,060,086 | A * | 5/2000 | Belanus | A61L 9/01 424/724 |
| 2001/0001218 | A1* | 5/2001 | Luongo | B29C 39/14 428/305.5 |
| 2008/0173586 | A1* | 7/2008 | Kanazirev | B01J 20/3236 210/660 |
| 2010/0012578 | A1* | 1/2010 | Kanazirev | B01J 20/3007 95/135 |
| 2010/0096594 | A1* | 4/2010 | Dahlin | B01D 53/10 252/372 |
| 2010/0243961 | A1* | 9/2010 | Hilton | C10J 3/58 252/373 |
| 2011/0020202 | A1* | 1/2011 | Gadkaree | B01J 35/04 502/185 |
| 2012/0192711 | A1* | 8/2012 | Henningsen | B01D 53/08 95/12 |
| 2012/0257929 | A1* | 10/2012 | Hater | C04B 18/16 405/129.95 |
| 2013/0026417 | A1* | 1/2013 | Paquet | C10J 3/482 252/373 |
| 2013/0312328 | A1* | 11/2013 | Xu | C10J 3/482 48/77 |
| 2016/0365593 | A1 | 12/2016 | Fronk | |
| 2019/0169513 | A1 | 6/2019 | Daggupati et al. | |
| 2019/0367814 | A1 | 12/2019 | Brandhorst, Jr. et al. | |
| 2022/0161224 | A1* | 5/2022 | Baek | B01D 53/02 |
| 2024/0084207 | A1 | 3/2024 | Simonpietri et al. | |

FOREIGN PATENT DOCUMENTS

| | | | |
|---|---|---|---|
| JP | 2003327974 A | * 11/2003 | |
| JP | 2004267988 A | 9/2004 | |
| WO | 9937740 A1 | 7/1999 | |
| WO | WO-2006031011 A1 | * 3/2006 | C10J 3/482 |

OTHER PUBLICATIONS

International Patent Application No. PCT/US2022/078925—International Search Report and Written Opinion mailed Mar. 15, 2023, 11 pages.

* cited by examiner

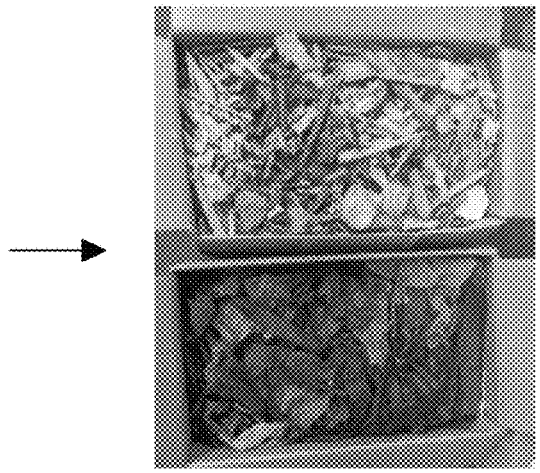
FIG. 2A  FIG. 2B
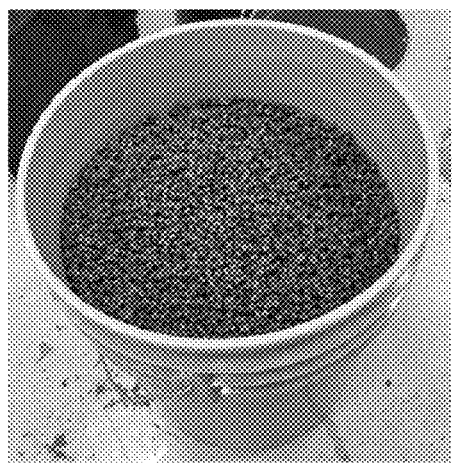
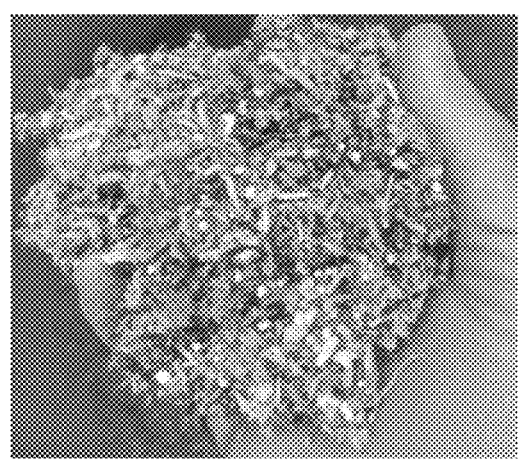
FIG. 2D  FIG. 2C

Gasifier Syngas Exit Compositions

| Seq # | Seq 1 | Seq 2 | Seq 3a | Seq 3b | Seq 4 | Seq 5 | Seq 6A | Seq 6B | Seq 6C | Seq 7 | Seq 8A | Seq 8B | Seq 9 | Seq 10 |
|---|---|---|---|---|---|---|---|---|---|---|---|---|---|---|
| Carbon Monoxide (CO) | 8.5 | 10.1 | 2.4 | 2.3 | 3.7 | 5.3 | 5.8 | 5.3 | 7.0 | 7.8 | 6.4 | 6.1 | 6.8 | 8.2 |
| Hydrogen (H2) | 10.0 | 13.4 | 1.7 | 1.9 | 4.2 | 7.3 | 7.7 | 6.8 | 9.7 | 11.5 | 9.8 | 10.9 | 12.0 | 10.2 |
| Carbon Dioxide (CO2) | 42.9 | 40.9 | 21.2 | 20.2 | 46.4 | 38.8 | 40.4 | 42.2 | 37.7 | 37.6 | 35.8 | 36.8 | 38.8 | 42.7 |
| Water (H2O) | 0.1 | 0.1 | 0.1 | 0.1 | 0.1 | 0.1 | 0.1 | 0.1 | 0.1 | 0.1 | 0.1 | 0.1 | 0.1 | 0.0 |
| Hydrogen Sulfide (H2S) | 0.040 | 0.049 | 0.065 | 0.051 | 0.041 | 0.041 | 0.043 | 0.043 | 0.48 | 0.054 | 0.049 | 0.051 | 0.049 | 0.125 |
| Nitrogen (N2) | 31.6 | 27.9 | 61.7 | 56.7 | 38.7 | 40.7 | 38.5 | 38.3 | 37.0 | 34.0 | 39.8 | 37.6 | 34.1 | 31.5 |
| Methane (CH4) | 2.8 | 3.9 | 0.7 | 0.8 | 1.5 | 2.9 | 2.8 | 2.4 | 3.5 | 4.2 | 3.3 | 3.6 | 3.5 | 3.6 |
| Mixed Hydrocarbons (HC) | 0.41 | 0.48 | 0.20 | 0.19 | 0.49 | 0.84 | 0.77 | 0.72 | 0.87 | 0.92 | 0.80 | 0.77 | 0.69 | 0.93 |
| Total | 96.3 | 96.9 | 88.0 | 82.1 | 95.2 | 95.8 | 96.0 | 95.8 | 96.0 | 96.0 | 96.0 | 95.9 | 96.1 | 97.3 |

FIG. 8

PROCESSING AND GASIFICATION OF CONSTRUCTION AND DEMOLITION MATERIALS

CROSS-REFERENCE TO RELATED APPLICATIONS

The present application claims the benefit of U.S. Provisional Application No. 63/273,589, filed Oct. 29, 2021, the disclosure of which is incorporated herein by reference in its entirety.

STATEMENT REGARDING FEDERALLY SPONSORED RESEARCH

The invention was made with U.S. Government support under Contract No 2020-33610-31974 and 2021-39410-35996 awarded by the U.S. Department of Agriculture and Contract No. C_68HERC21C0025_0_RCI awarded by the U.S. Environmental Protection Agency. The Government has certain rights in this invention.

TECHNICAL FIELD

This present disclosure relates to processing and gasification of construction and demolition materials.

BACKGROUND

A significant amount of construction and demolition (C&D) wood waste is sent to landfills every year. According to the U.S. Environmental Protection Agency (EPA)'s report in 2017, approximately 570 million tons of C&D waste alone are generated in the U.S. on average per year, which is more than twice the amount of generated municipal solid waste. While there is a clear advantage and need to recycle C&D wood waste, there are several challenges that exist and prevent such recycling from happening on a commercial scale. For example, C&D wood waste can have high levels of heavy metal contaminants, which can include, for example, chromated copper arsenate (CCA), micronized copper azole (MCA), and borates (e.g., disodium octaborate tetrahydrate), as well as other undesirable chemical contaminants, such as sulfur, lead, tars, and ash. These and other contaminants can exist, for example, due to lumber treatment and fire retardant methods, and have prevented or limited recycling of the bulk of C&D wood waste in industrial processes (e.g., biomass power plants, anaerobic digestion, incinerators), due to the presence of the contaminants which make processing of C&D waste difficult and uneconomical to do while complying with U.S. environmental regulations. The heavy metals in C&D waste also are hazards to the refining industry (e.g., to fuel refining catalysts), as well as human health and the environment.

In addition to the processing difficulties presented by these contaminants themselves, C&D debris also includes heterogeneous physical and chemical characteristics that can vary significantly amongst the C&D debris and thus make quality control and treatment of the C&D debris difficult. As an example, sulfur content can range from approximately 0.10% to 6.0% by weight, and arsenic content can range from approximately 33 to 780 mg/kg. For at least these reasons, processing and/or gasification of C&D debris has been restricted to only "clean" wood which is not painted, treated, or resinated and furthermore must be professionally separated from "dirty" wood and the rest of the C&D debris by a competent C&D recycler per U.S. environmental regulations. As a result, a significant amount of C&D waste is disposed of in C&D landfills. Additionally, because of the foregoing issues, C&D waste currently cannot be converted (e.g., via conventional gasifiers) to produce fuels (e.g., transportation fuels, aviation fuels, etc.). Accordingly, improved ability to process C&D waste is needed.

BRIEF DESCRIPTION OF THE DRAWINGS

Features, aspects, and advantages of the presently disclosed technology may be better understood with regard to the following drawings.

FIGS. 2A-2D are images of construction and demolition debris, in accordance with embodiments of the present technology.

FIG. 8 is a chart illustrating syngas compositions for experimental runs, in accordance with embodiments of the present technology.

Figure 1A:
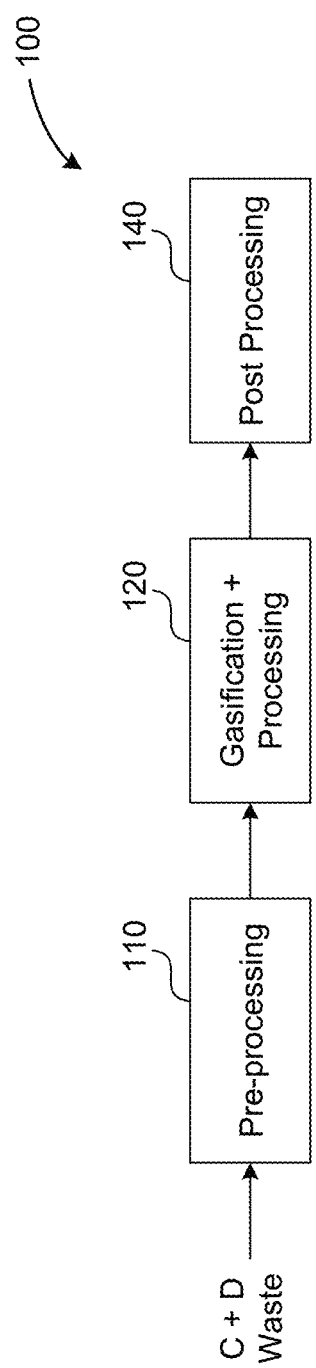
FIG. 1A is a schematic block diagram of a process for processing construction and demolition materials to produce one or more products, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

As noted above, hundreds of millions of tons of C&D waste are generated in the U.S. per year, and there are inadequate means to process the C&D waste in existing systems due to (i) the high levels of heavy metal and/or chemical contaminants and (ii) the wide range of heterogeneous physical and chemical characteristics amongst the C&D debris. Embodiments of the present disclosure, which relate generally to the processing and gasification of C&D materials, address at least some of the above-described issues. For example, embodiments of the present technology provide an ability to divert organic C&D materials from landfill disposal and re-use them as a feedstock for the production of low greenhouse gas (GHG) energy and fuels (e.g., electricity, hydrogen, jet fuel, diesel fuel, renewable natural gas etc.). As described in detail below, embodiments of the present technology can include systems, devices, and methods for producing such fuels by pre-processing C&D waste to produce a C&D feed, and gasifying the C&D feed to produce syngas and one or more ash products that have commercial value. The produced syngas can be provided to post-processing units, such as one or more of a cracking unit, guard bed, scrubber, methanator, and/or hydrotreater, to produce fuels. In doing so, embodiments of the present technology enable C&D waste, which is currently in abundance and not able to be meaningfully re-used, to be processed and produce multiple products that have commercial value in multiple industries. Additionally, embodiments of the present technology enable the production of transportation fuels that have a GHG emissions rate less than the predominant current methods for producing the same transportation fuels. Additional benefits of the technology are described below.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Processing C&D Materials, and Associated Systems, Devices and Methods

FIG. 1A is a schematic block diagram of a process 100 for processing C&D waste and materials to produce one or more end products, in accordance with embodiments of the present technology. The C&D waste can include mixed organic and inorganic waste, such as polyvinyl chloride (PVC), untreated wood (e.g., plywood, pallets, studs, and/or cabinets), treated wood (e.g., chromated copper arsenate (CCA) treated wood, and/or borate (e.g., HI-BOR) treated wood), fire-retardant-treated fabrics and organic materials, rubber, soil, ceramics, foam (e.g., Styrofoam, insulation, coolers, and/or protection for shipping appliances and household fixtures), shingles, gypsum, siding, metals, furniture, concrete, tiles, paper and cardboard (e.g., shipping protection for appliances and other home fixtures), yard waste (e.g., landscaping waste, site clearing waste, logs, stumps, and/or branches), plastics (e.g., home wraps, disposal bags, appliance packaging, vinyl siding, and/or vinyl fencing), carpet, rubber (e.g., tires, rubber flashing, etc.), and other non-combustibles. As a result of these waste materials, C&D materials generally have not been able to be recycled or re-used, e.g., because combustion of these contaminated materials can cause air emissions to exceed regulatory levels in the U.S. and other jurisdictions, and therefore are instead commonly landfilled. For example, one PVC pipe in a load of C&D waste can contain enough chloride to produce corrosive gases when burned or gasified, and damage equipment and/or cause the air emission limits of a biomass power plant combusting this material to be exceeded. Relative to incineration or other combustion means for eliminating C&D waste, gasification processes can result in less air pollution, higher energy recovery, and lower GHG emissions, amongst other desirable effects.

The C&D materials can also include harmful chemicals that make their recycling untenable and processing more difficult. For example, as shown in Table 1 below, on average the separated C&D wood and organic waste materials can include arsenic, boron, cadmium, chromium, lead, and sulfur at levels one or more orders of magnitude greater than that seen in commercial timber wood or clean wood waste. In fact, for the heavy metals arsenic, boron, and chromium, levels in C&D materials on average are above 100 mg/kg, which is high enough to elevate them from trace metal schedules to minor element schedules. In particular embodiments C&D materials processed by embodiments of the present technology can include an arsenic content of about 86 milligrams (mg)/kilogram (kg), chromium content of about 124 mg/kg, and/or copper content of about 500 mg/kg. In addition, on average the C&D materials can include a sulfur content of about 2.8% and a chlorine content of about 1.9% on average, both of which are known to cause irreversible damage to industrial processing units and/or catalysts. Moreover, these harmful chemicals can vary significantly amongst different C&D materials. For example, sulfur in organic C&D waste samples has been shown to vary from as low as 0.11% to as high as 6.0% by weight. Additionally, the C&D materials can range in (i) size, e.g., from 20 feet sections of pipe to shards of broken PVC siding; 4 foot×8 foot sheets of plywood to sawdust; (ii) density, e.g., including high density materials (e.g., concrete, rock, and hardened steel) that cannot be ground in traditional refuse-derived fuel shredders to low-density materials (e.g., plastic films and paper); and (iii) strength, from brittle materials like fiberboard to flexible plastics and greenwaste. As such, the composition of incoming C&D material feed is relatively heterogeneous, which is generally undesirable for processing via traditional gasification methods.

As shown in Table 1 below, metals can have a greater presence in C&D materials relative to municipal solid waste (MSW), wood (e.g., Douglas Fir), and coal (e.g., bituminous Kentucky No. 9 Coal). For example, arsenic, chromium, copper, nickel, and lead content are on average more than double that of MSW, wood, or coal. Boron is present at a high level in organic C&D waste, typically undetectable in wood or coal, and not normally tracked in MSW due to its low incidence rate. The presence of these metals can be harmful to the environment and/or the state of the art for waste-to-energy conversion processes, as explained elsewhere herein, and has inhibited the ability to recycle or re-use C&D materials generally.

TABLE 1

Comparison of Gasification Feeds

| Type of Feed<br>Date range of samples | | C&D<br>(HI 2009-2021) | MSW<br>(U.S. Avg 2017) | Wood<br>(U.S. Avg 2008-22) | Coal<br>(Bituminous) |
|---|---|---|---|---|---|
| Proximate | Heat Content (HHV, MJ/kg, dry) | 17.6 | 18.9 | 17.5 | 25.7 |
| | Moisture, Air Dry (%) | 2.3 | 21.0 | 7.5 | NS |
| | Moisture, As Rec'd (%) | 17.1 | 21.4 | 20.1 | 20.6 |
| | Fixed Carbon (%) | 17.1 | 11.0 | 14.3 | 47.6 |
| | Volatiles (%) | 71.3 | 67.4 | 72.6 | 38.4 |
| | Ash (%) | 12.7 | 16.0 | 3.1 | 11.8 |
| Ultimate | Sulfur (%) | 0.6 | 0.9 | 0.01 | 1.5 |
| | Chlorine (%) | 2.1 | 0.6 | 0.0 | 0.0015 |
| | Carbon (%) | 43.9 | 46.2 | 46.7 | 61.9 |
| | Hydrogen (%) | 6.2 | 6.0 | 5.7 | 5.4 |
| | Oxygen (%) | 40.4 | 33.6 | 39.0 | 21.0 |
| Metals in Fuel (mg/kg) | Arsenic (Dry) | 106 | 23.0 | 0.03 | 3.09 |
| | Boron (As Rec'd) | 224 | NS | 0 | 0.0 |
| | Cadmium (As Rec'd) | 2 | 1.3 | 0.04 | 0.47 |
| | Chromium (As Rec'd) | 209 | 50.6 | 0.3 | 9.21 |
| | Copper (As Rec'd) | 472 | 110.0 | 1.675 | 8.0 |
| | Lead (As Rec'd) | 108 | 53.9 | 0.26 | 3.90 |
| | Potassium (mg/kg) | 4,417 | NS | 0 | 770.0 |

Other characteristics of C&D materials that affect processing (e.g., in thermochemical systems such as combustion, pyrolysis, and gasification) and as shown in Table 1 above include (i) volatile organic compounds (e.g., tars), which in C&D materials are almost twice the level of coal; (ii) sulfur, which is typically not detectable in wood but in organic C&D is on par with the amount found in MSW, and creates acid gas at gasification temperatures; (iii) moisture, which in C&D materials is usually less than half the level seen in MSW or wood and thus is a major advantage for C&D as moisture creates handling and yield challenges; (iv) ash, which is normally below 4% in clean wood but averages above 12% in C&D waste wood; and (v) energy content, where C&D is closer in heat value to wood and MSW and 30% lower than that of coal and therefore requires more careful management for profitable operation.

Despite the prevalence of contaminants, C&D materials have significant chemical energy that can be recovered via gasification. For example, mixed organic waste portion of C&D materials, which can comprise 40-60% of overall C&D waste, can include on average a fixed carbon content of about 17%, a volatiles content of about 70%, an ash content of about 13%, and a heat value of about 17 Mega Joules (MJ)/Kilogram (kg). Additionally, moisture content can range from about 6% to 21% on a wet "as-received" basis before processing, which is relatively low for an organic and renewable feedstock.

In view of the composition described above and referring to FIG. 1A, the process 100 can include preprocessing mixed C&D waste (block 110) to produce a prepared C&D feed. Pre-processing of the C&D materials can include removing inorganic materials, reducing the particle size of the C&D organic materials to meet a particular particle size distribution and/or particle size specification (e.g., the International Standards Organization (ISO) Standards for Solid Biofuels), and/or otherwise preparing the C&D materials for feeding into a gasifier. The process 100 can further include gasification and/or processing the C&D feed (block 120), which can produce syngas, as well as or more ash products (e.g., bed ash, fly ash, ash fines, etc.) that include at least a portion of the contaminants discussed above. The ash products can be disposed of via safe, non-hazardous means, and/or be used for commercial purposes, e.g., in cement and/or concrete production processes. The process 100 can further include post-processing (block 140), which can include directing the produced syngas and other fluid streams produced via gasification to one or more of a fuel refining process such as a cracking unit, scrubber, methanator, and/or hydrotreater. In doing so, green hydrogen, renewable natural gas, jet fuel, diesel fuel, and/or other valuable fuels and products can be produced.

There are multiple advantages of the process 100 and embodiments of the present technology. For example, embodiments of the present technology can reduce the stockpile of C&D materials currently building in the United States and around the world, which currently are not recycled or meaningfully reused for the reasons described herein. As another example, embodiments of the present technology can produce multiple products (e.g., hydrogen, fuels, secondary cementitious materials, etc.) that can have commercial uses in different industries, thus creating a market around processing of C&D materials. For instance, the bed ash and/or fly ash produced via embodiments of the present technology can include minerals that can be utilized in a variety of industries. As but a few examples, the bed ash and fly ash can include: (i) magnesite ($MgCO_3$) which can be used for refractory materials and also permanent sequestration of carbon through mineralization, (ii) dolomite ($Ca(Mg,Fe)(CO_3)$) which can be used as gasification bed materials, (iii) akermanite ($Ca_2Mg(Si_2O_7)$) which can be used for ceramics and medical implants, (iv) portlandite ($Ca(OH)_2$) which can be used for cement and concrete, and (v) calcite ($CaCO_3$) which can be used for acid gas scrubbing. Additionally, the bed ash can include merwinite ($Ca_3Mg(SIO_4)_2$) which can be used for dolomite manufacturing, and graphite (($CO_3)_2$) which can be used for refractory and/or electrical conductivity purposes.

Figure 1B:
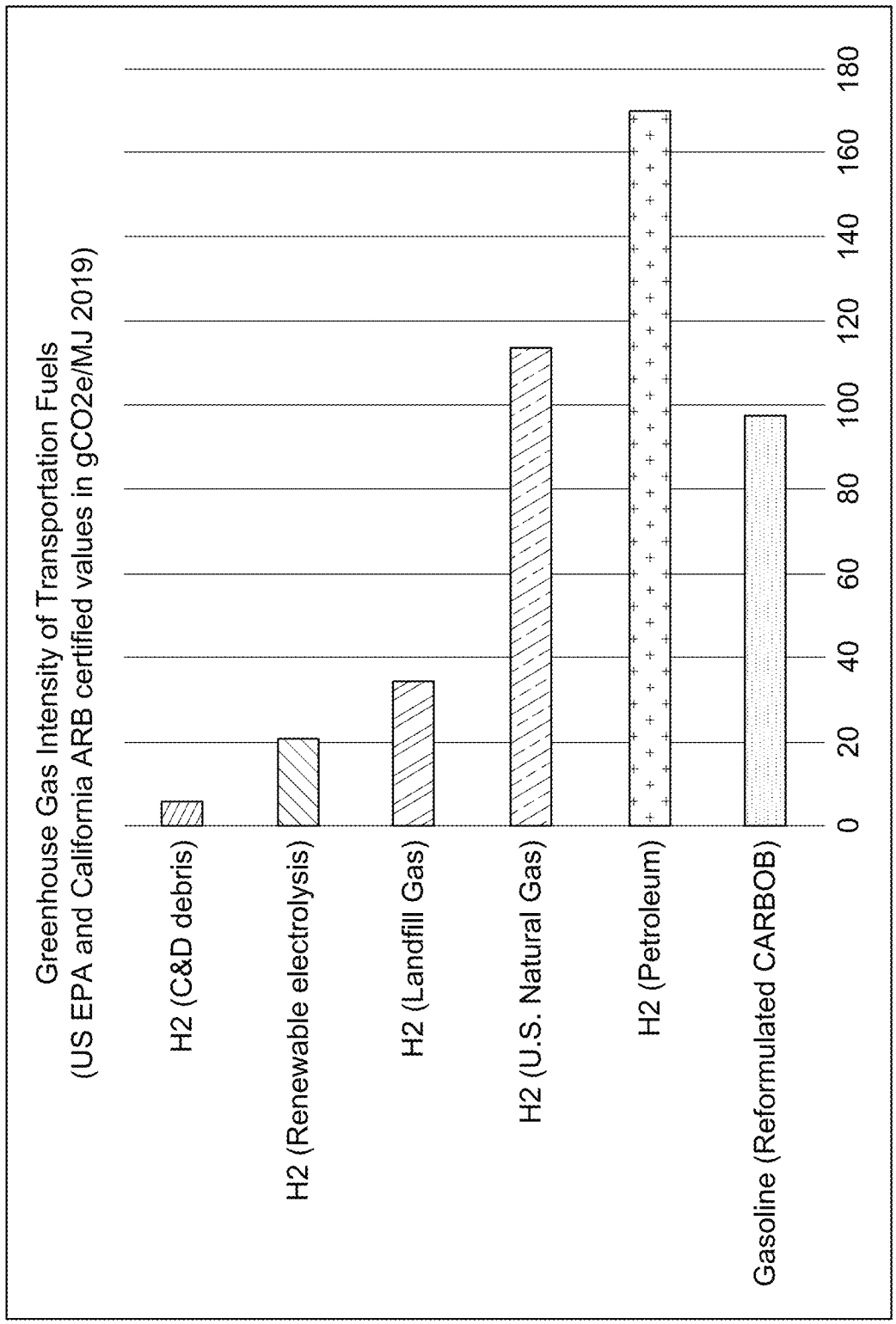
FIG. 1B is a chart illustrating greenhouse gas (GHG) emissions intensity for various transportation fuels.

FIG. 1B is a chart illustrating greenhouse gas (GHG) emissions intensity for various transportation fuels, and provides another example of the benefits the products produced via the embodiments of the present technology. For example, as shown in FIG. 1B, for the production of hydrogen, the GHG intensity as calculated by the U.S. Greenhouse Gases, Regulated Emissions, and Energy Use in Technologies (GREET) model is less than that of hydrogen produced via either solar-powered electrolysis or landfill gas, and significantly less than that of hydrogen produced from U.S. natural gas or petroleum, or the intensity of California reformulated blendstock for oxygenate blending (CARBOB) gasoline which is the benchmark by which greenhouse gas intensity is measured under the State of California's Low Carbon Fuel Standard (LCFS).

Figure 1C:
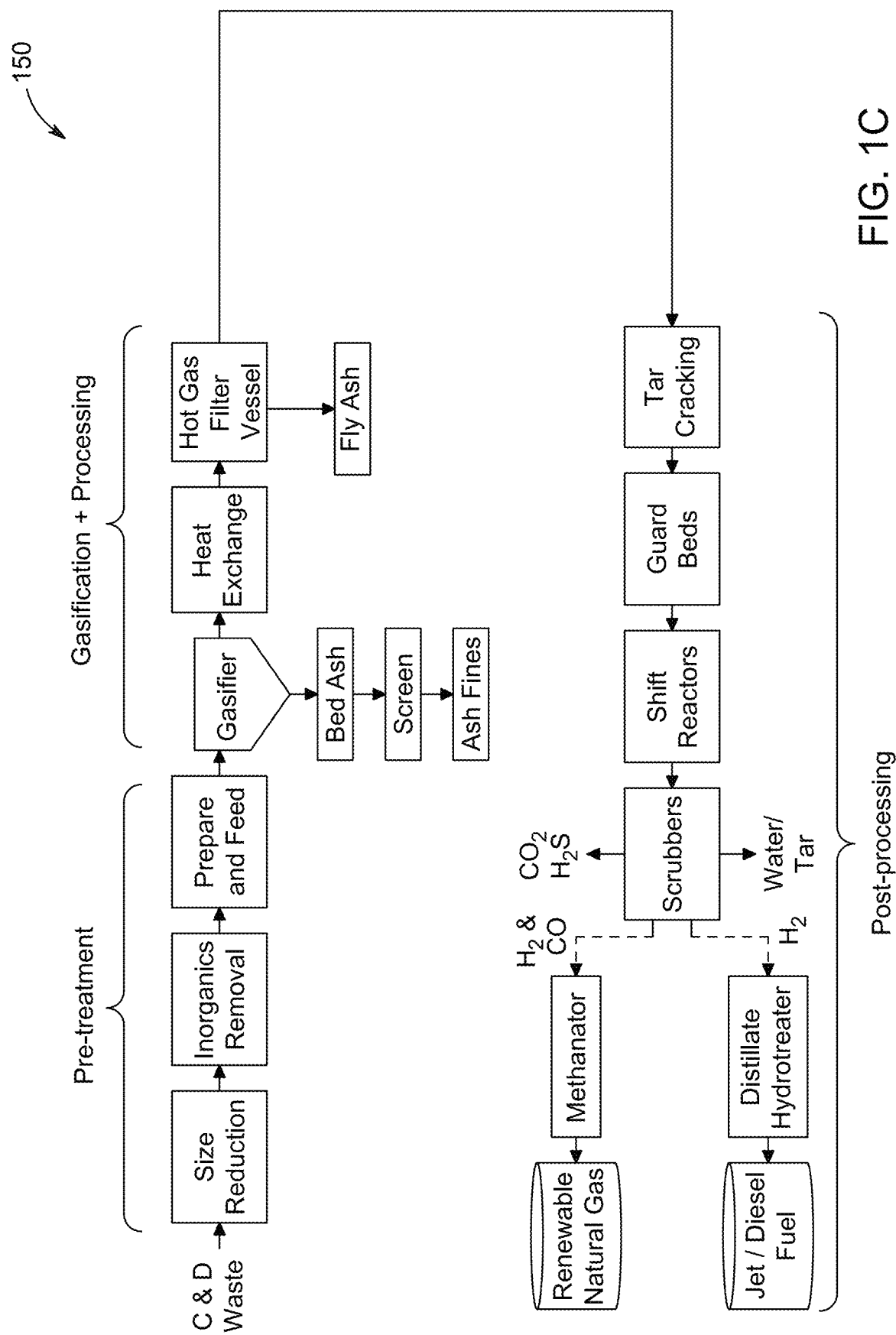
FIG. 1C is a more detailed schematic block diagram of the process of FIG. 1A for processing construction and demolition materials to produce one or more products, in accordance with embodiments of the present technology.

FIG. 1C is a schematic block diagram of a process 150 that expands on the concepts introduced via the process 100 of FIG. 1A. As shown in FIG. 1C, the process 150 includes the preprocessing, gasification, and post-processing steps described with reference to FIG. 1A. The pre-treatment step can include size reduction and/or removal of inorganic and other materials (e.g., metals, dirt, rocks, concrete, etc.) that may not be used in an economical way for fuel production. The size reduction and/or material removal can be done with manual and/or automatic processes. For example, ferrous and non-ferrous metals and other magnetic materials can be removed via machines and/or manual sorting, and the metal and other materials can be sold. As another example, materials such as drywall, which have relatively high sulfur content and are thus generally undesirable to industrial processes, may be manually removed. The size reduction of the C&D materials can be done in multiple steps, as described with reference with FIGS. 2A-2E, to produce a C&D feeds for gasification purposes that has a desirable particle size distribution. In some embodiments, e.g., after size reduction and/or the removal of inorganic materials, the remaining C&D feed which has a particle size below the minimum level indicated for a gasification system, can be further processed via mixing with a densification fluid, which can beneficially alter the physical characteristics of the feedstock in handling and feeding for gasification, especially into pressurized units.

After preprocessing of C&D waste, the resulting C&D feed can be fed to a gasifier system. As described elsewhere herein (e.g., with reference to FIG. 3), the gasifier system can receive oxygen (e.g., pure oxygen or air), steam, and a bed fluidization material (such as materials commonly used in coal gasification: dolomite, silica, limestone, and/or olivine) which together promotes gasification of the C&D feed to produce (i) syngas or product comprising major gas species hydrogen, carbon monoxide, and carbon dioxide, and (ii) ash (e.g., bed or bottom ash) including some or a majority of the undesirable contaminants (e.g., arsenic, chromium, and/or copper), as described elsewhere herein (e.g., with reference to FIGS. 5-7). The syngas or outlet from the gasifier can be directed to a hot gas filter vessel (HGFV), in which fine ash particles (e.g., fly ash) can be removed. The fly ash can also include some of the undesirable contaminants, as described elsewhere herein (e.g., with reference to FIGS. 5-7). Stated differently, the undesirable contaminants of the C&D feed can be sequestered in the bed ash and/or the fly ash, and thus be separated from the syngas to protect downstream equipment and processes. Moreover, the undesirable contaminants can be sequestered via the ash in a way that inhibits the solubility in water, enabling the ash to pass environmental tests for non-hazardous waste disposal and/or re-use in one or more products. In some embodiments, fluid from the HGFV can be cooled to create a condensate, which may be recycled and/or utilized within the system, e.g., to create steam. Removing the ash and condensate that include the undesirable contaminants can help ensure all or a substantial portion of these contaminants are not routed to post-processing of the syngas stream, as such contaminants can damage catalysts and other equipment of processes for producing fuels, e.g., green hydrogen, renewable natural gas and/or other transportation fuels. As shown in FIG. 1C, the ash can be used commercially for uses in the cement, concrete, and and/or other industries.

As shown in FIG. 1C, the syngas produced via gasification and from the HGFV can be further processed in post-processing units, including a tar cracking unit, guard/sorbent bed, shift reactor, scrubber, methanator, and/or hydrotreater; as well as biological units such as gas fermentation systems. These post-processing units can be fluidically coupled to the gasification and units such as gas fermentation technologies processing portion of the process 150. As such, one or more of the units described with reference to the gasification and processing portion (e.g., the gasifier and/or HGFV) can be tied into these post-processing units, which may already be present in existing refineries, and thereby enable them to begin processing C&D waste and/or receiving syngas produced from C&D feed. As such, one advantage of embodiments of the present technology is that the syngas from the C&D feed can be processed to be compatible and useful in existing petroleum or renewable fuel and chemical refineries or related gas processing facilities, without requiring retrofit or modification of those refineries.

FIGS. 2A-2D are images of construction and demolition debris, in accordance with embodiments of the present technology. Specifically, FIG. 2A is an image of a C&D waste load prior to any treatment or processing, and FIG. 2B is an image of samples of C&D materials after crushing and mechanical separation, e.g., by a 9", 6", 4", 3", 2", 1" or ½" minus slot via a commercial sorting facility, metals removal, and density or optical separation (e.g., via an air knife). As described elsewhere herein, embodiments of the present technology can process and/or gasify "light" materials such as plastic bags, films, fabric and paper, which can improve recycling conversion and landfill diversion. These "light" materials are typically thrown away and landfilled, and thus the ability to utilize these materials is but one advantage that embodiments of the present technology provide. In some embodiments, the C&D materials after such size reduction/optimization and mechanical separation are fed (e.g., via gravity feed, plug-flow, ram-fed, etc.) into the gasification chamber of the present technology and the steps described with reference to FIGS. 2C and 2D are omitted.

FIG. 2C is an image of C&D materials after further treatment from the image of FIG. 2B, in which the C&D materials have been screened for metal and rock, ground, and sifted to a predetermined particle size to meet the solid fuel specifications of the gasification technology (e.g., between 1-10 mm for one representative gasification technology). FIG. 2D is an image of C&D materials after further treatment from the image of FIG. 2C, in which the C&D materials may be densified into pellets to be able to feed into the hopper of certain gasifiers of the present technology. In some embodiments, a bed sorbent (e.g., silica, limestone, dolomite, calcium, and/or olivine) can be added to the treated C&D materials.

As previously described, in some embodiments, the C&D materials can be treated (e.g., mixed) with additives or fluids to alter material or chemical characteristics of the resulting C&D feed either prior to or concurrent with feeding into the gasification chamber. For example, certain additives can enable binding and/or sequestration of the undesirable contaminants discussed above such as volatile toxic elements arsenic, chromium, and sulfur. Additionally or alternatively, the additives can help form a more homogenous and/or desirable particle size distribution, e.g., to enable better processing via the gasifier and downstream units.

Figure 2E:
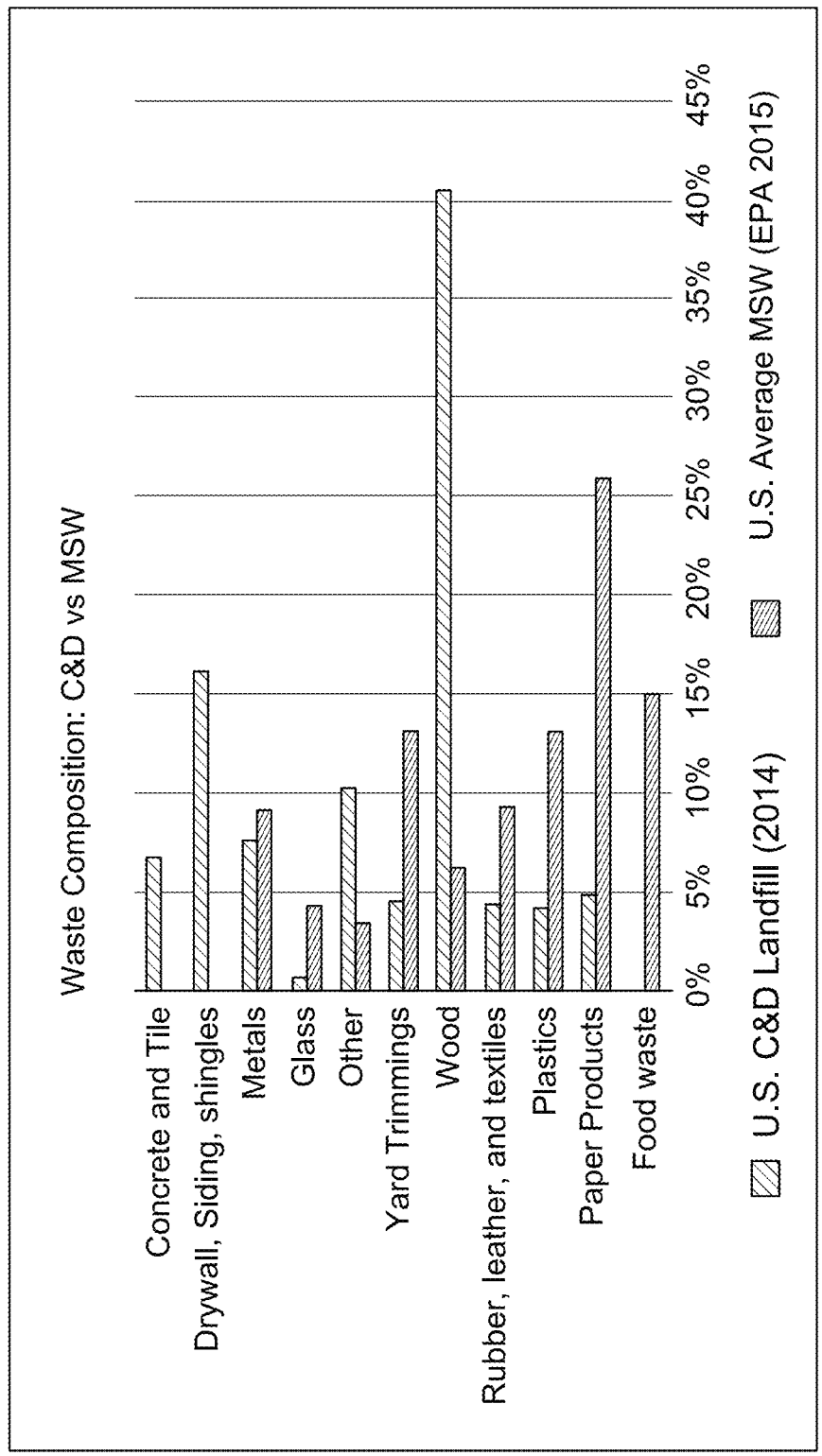
FIG. 2E is a plot illustrating a comparison of waste compositions of construction and demolition waste and municipal solid waste.

FIG. 2E is a plot illustrating a comparison in composition of the C&D waste and the MSW, in accordance with embodiments of the present technology. As shown in FIG. 2E, C&D waste can include materials that are not included in substantial amounts in MSW, such as concrete, tile, drywall, siding, and shingles. These materials can make processing of the C&D waste difficult, as they are heavy, large, and dense and so present both a safety challenge in handling and an equipment challenge as they may jam or break typical size reduction equipment. Additionally, C&D waste can include a higher percentage content of wood relative to MSW, and which, as previously described, can include treated, painted, and resinated wood which is restricted from re-use in energy and fuel conversion systems by U.S. regulation.

Figure 2F:
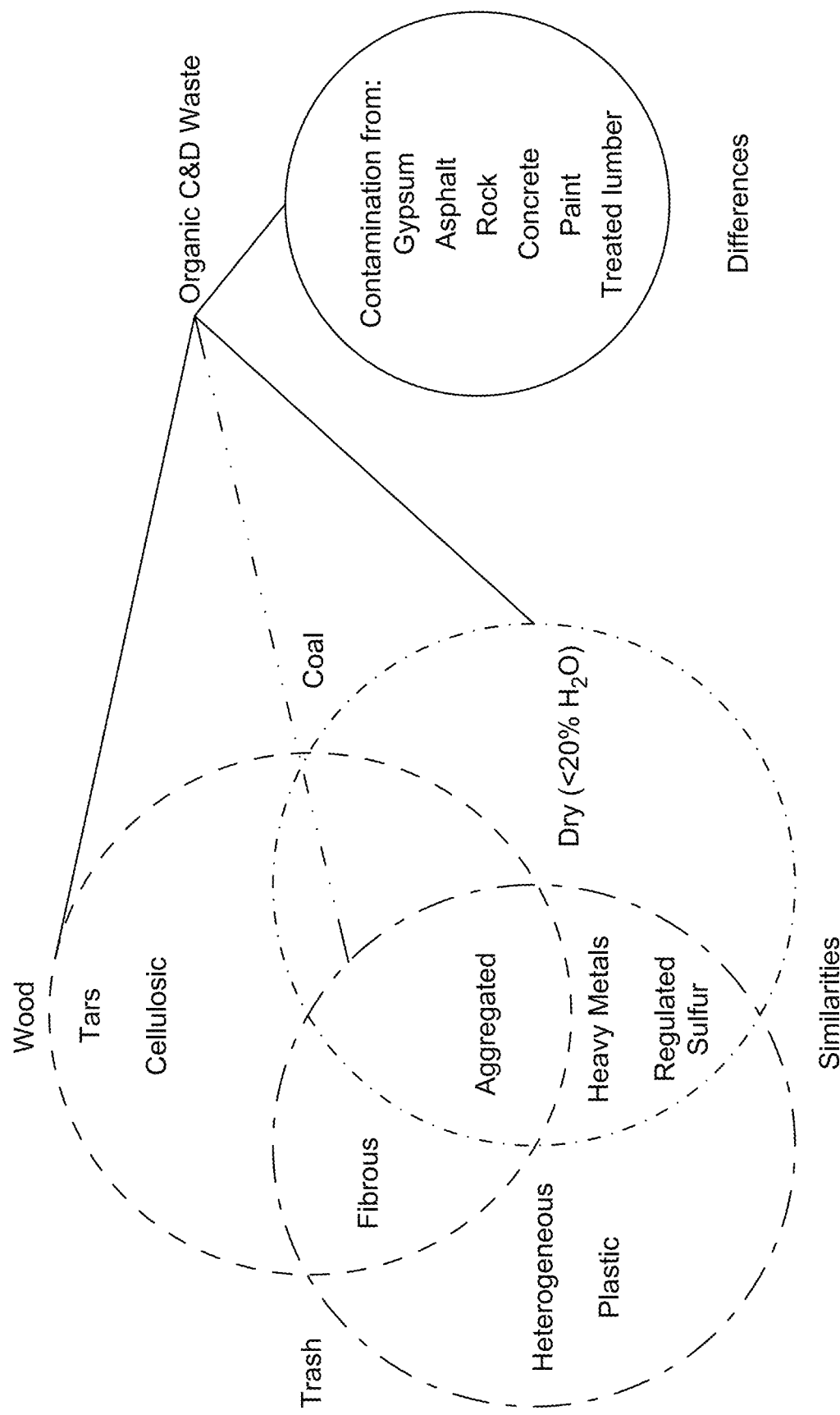
FIG. 2F is a diagram illustrating similarities and differences of organic construction and demolition waste to other gasification feedstocks.

FIG. 2F is a diagram illustrating similarities and differences of organic C&D waste feed relative to other gasification feedstocks, including wood, MSW (trash), and coal. As shown in FIG. 2E, wood, trash, and coal each share similar materials with organic C&D waste. For example, (i) wood and C&D waste both include tars, cellulosic, and fibrous materials, (ii) coal and C&D waste both include heavy metals, sulfur, and a moisture content less than 20%, and (iii) MSW and C&D waste both include fibrous materials, plastic materials, and a heterogeneous composition. However, all of these other gasification feedstocks are different from C&D waste in that they do not include high levels of borate-treated material, gypsum, asphalt, rock, concrete, or paint, each of which create their own difficulties with regard to gasification processing. In addition to the safety and materials handling challenges discussed above, gypsum and/or cardboard introduce a significant amount of sulfur into the feed which then requires downstream acid gas removal of hydrogen sulfide ($H_2S$) gas. Inorganic material in large quantity or larger particle size like rocks, shingle, and nails can also change the stoichiometrics of the gasification reaction and build up to block the fluidization of the gasification bed, causing reaction failure.

Figure 3:
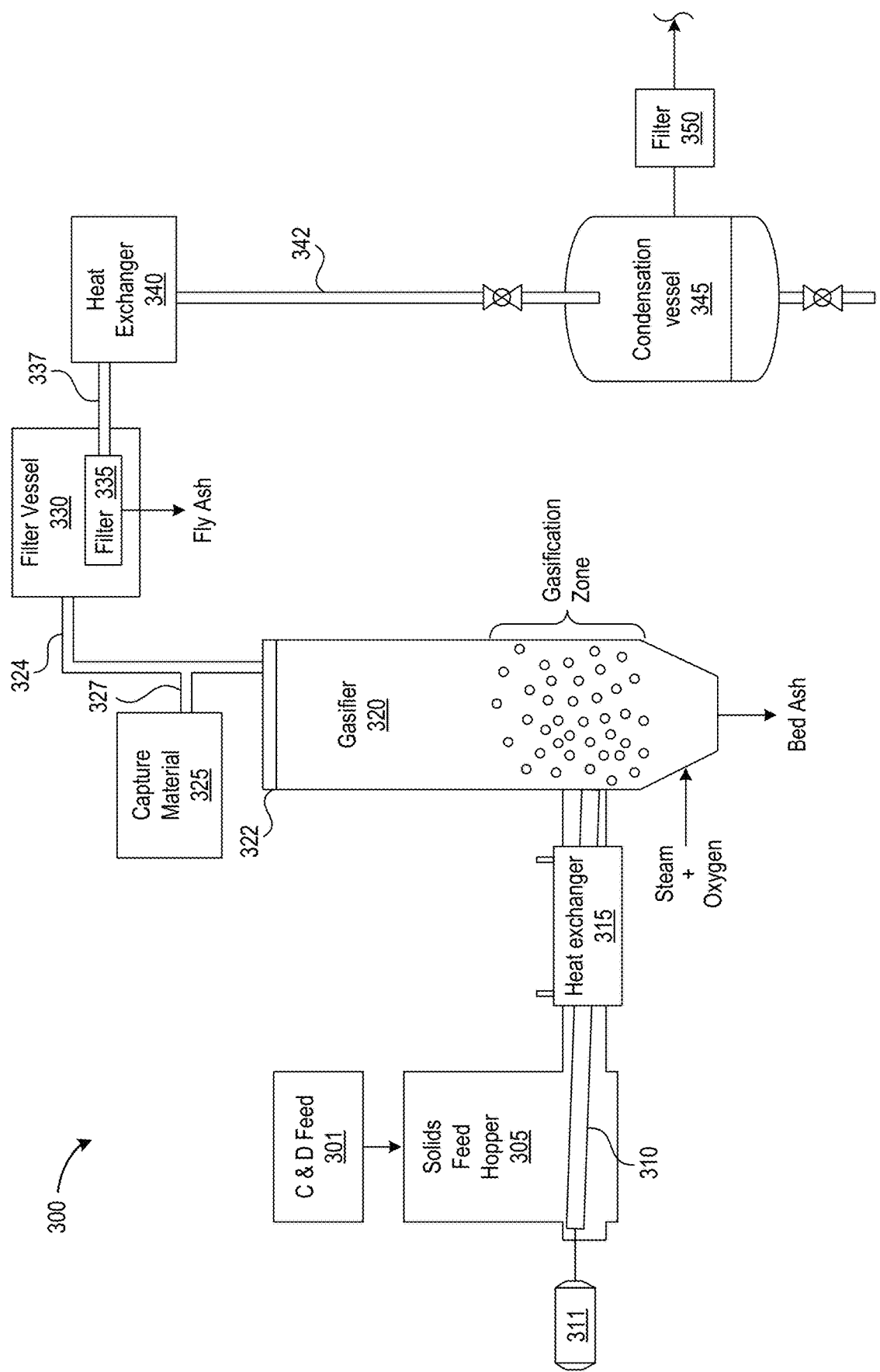
FIG. 3 is a schematic view of a gasification system, in accordance with embodiments of the present technology.

FIG. 3 is a schematic view of a gasification system 300, in accordance with embodiments of the present technology. As shown in FIG. 3, the system 300 can include a solids feed hopper 305 (e.g., an inlet) configured to receive C&D feed 301, and a feeder 310 (e.g., a feed screw, plug flow, extruder, etc.) operably coupled to a motor 311 configured to rotate the feeder 310. The C&D feed 301 can correspond in whole or in part to the C&D waste described with reference to FIG. 1A, and/or the composition and properties described in Table 1 above. For example, the C&D feed 301 can include the untreated wood, treated wood, paper and cardboard, yard waste, plastic, rubber, and/or Styrofoam. In some embodiments, the C&D feed 301 comprises at least 50% untreated wood, at least 10% treated lumber, at least 5% paper and cardboard, at least 5% yard waste, at least 5% plastic, at least 1% rubber, and/or at least 1% foam. Additionally or alternatively, the C&D feed 301 can include a composition including boron, arsenic, chromium, lead, and/or boron.

The rotating feeder can cause the C&D feed 301 to be fed through the hopper 305 into the gasification chamber. The C&D feed 301 can be fed to the system 300 via a steady-state operation, or if desired in a batch process. As previously described, materials including limestone, dolomite, olivine, silica sand, and/or another bed sorbent can be mixed into the feed or fed into the gasification bed to mix in the chamber with the feed. Advantageously, dolomite, olivine (and other materials) have mineral compositions that have a greater binding affinity for certain heavy metals (e.g., arsenic, boron, and/or chromium), relative to other bed materials. The system 300 can include a heat exchanger 315 fluidically coupled to the feeder 310 and positioned to heat the crushed C&D feed prior to being fed to the gasifier 320. During operation, the hopper 305 and downstream line can be pressurized to a predetermined level.

The system 300 further includes a gasifier or thermochemical device 320 ("gasifier 320") positioned to receive the prepared and/or heated C&D feed (e.g., at an intermediate or first portion of the gasifier 320), and a filter vessel 330 (e.g., a HGFV) downstream of the gasifier 320. The gasifier 320 can be a fluidized bed gasifier, non-fluidized bed gasifier (e.g., downdraft gasifier, updraft gasifier, moving grate gasifier, etc.), or other pyrolysis device. In addition to receiving the crushed and/or heated C&D feed, the gasifier 320 is configured to receive pressurized steam and oxygen (e.g., air or purified oxygen) at a lower or second portion of the gasifier 320, the combination of which passes upward through a bed plate of the gasifier 320 to an upper or third portion of the gasifier 320 and keeps the bed material (e.g., the dolomite and/or olivine) and the crushed and/or heated C&D feed in a gasification zone of the gasifier 320. In operation and without being bound by theory, the wood and other organic material of the C&D feed 301 change phase from solid to gas in the gasification zone above the bed and rise within the gasifier 320. A continuous raw syngas stream 324 including tar is produced via the gasifier 320, and is directed from the top of the gasifier 320 (i.e., a gasifier head) via a gasifier outlet 324 to the filter vessel 330. The gasifier 320 can capture in the bed of the gasifier 320 volatile heavy metals and/or contaminants, which are then captured in bed ash from the gasifier 320 and/or fly ash in the filter vessel 330 downstream of the gasifier 320. In doing so, the system 300 produces bed ash that includes volatile heavy metals and/or contaminants (e.g., arsenic and/or chromium) that have been (i) sequestered from the syngas and thus are prevented from damaging downstream equipment and processes and (ii) immobilized in such a way as to reduce escape into the environment through air emissions or water leachate. As described elsewhere herein, the produced ash can be used for commercial purposes, e.g., in the cement and/or concrete industries.

The filter vessel 330 can have an operating temperature within a range of 400° F. to 750° F. In some embodiments, the system 300 can include one or more heat exchangers (not shown) between the gasifier head and the filter vessel 330, e.g., to cool the gas from the gasifier head to a desired temperature. The filter vessel 330 can include (e.g., contain and/or enclose) one or more filters 335 (e.g., a candle filter) through which the syngas passes and can trap fly ash. The fly ash obtained via the filter vessel 330 and/or filter 335 therein can include contaminants (e.g., arsenic and/or chromium), and thereby prevent these contaminants from damaging downstream equipment. As previously described, the fly ash can be used for commercial purposes. Gas from the filter vessel 330 is directed via a filter outlet 337 to a heat exchanger 340 that cools the gas from the filter vessel 330, and is then directed via a condensation vessel inlet 342 to a condensation vessel 345 (e.g., a knockout pot), which causes condensate to be recovered and removed from the gas stream. The gas stream can then be directed to a subsequent filter 350 which can capture additional contaminants, and post-processing units which, as previously described, can include one or more of a cracking unit, guard bed, scrubber, methanator, thermal oxidizer, combustor, and/or hydrotreater. In doing so, green hydrogen, natural gas, jet fuel, diesel fuel, electricity, and/or other valuable energy products can be made.

Operation of the gasifier 320 can occur at relatively modest pressures, such as at no more than 200 psi, 160 psi, 120 psi, 80 psi, 70 psi, 60 psi, 50 psi, 40 psi, 30 psi, 20 psi, 10 psi, 5 psi, atmospheric pressure, or within a range of 1-200 psi, 20-200 psi, 20-120 psi, 20-70 psi, 20-60 psi, 20-50 psi, or 20-40 psi. Such pressures are lower than many conventional gasifiers, which can instead be 200-500 psi. Operating at these higher pressures is traditionally preferred for most gasifiers as higher pressures increase the conversion rate of the feed materials to syngas. Additionally, the feed to traditional gasifiers is generally homogeneous in that the variation in composition of the feed is relatively low. For embodiments of the present technology, operating the gasifier 320 at the lower pressures described above can be done to (i) facilitate feeding the heterogeneous composition of the C&D feed that can have a relatively high variation, (ii) allow for lower cost operation and simpler vessel design, and (iii) allow for less complex connections to supporting equipment. Additionally, operating the gasifier 320 at lower pressures than conventional gasifiers enables higher GHG reduction, as there is less energy needed to compress inlet gases and/or feed solids into a compressed gas flow. Moreover, because embodiments of the present technology may be more directed to removing undesirable contaminants and/or producing syngas meeting certain quality assurance standards, as opposed to, e.g., maximizing conversion rate, operating the gasifier at the lower pressures disclosed above can be beneficial. Relatedly, embodiments of the present technology may preferably operate at such lower pressure to decrease the likelihood of plugging within the gasifier.

Figure 4:
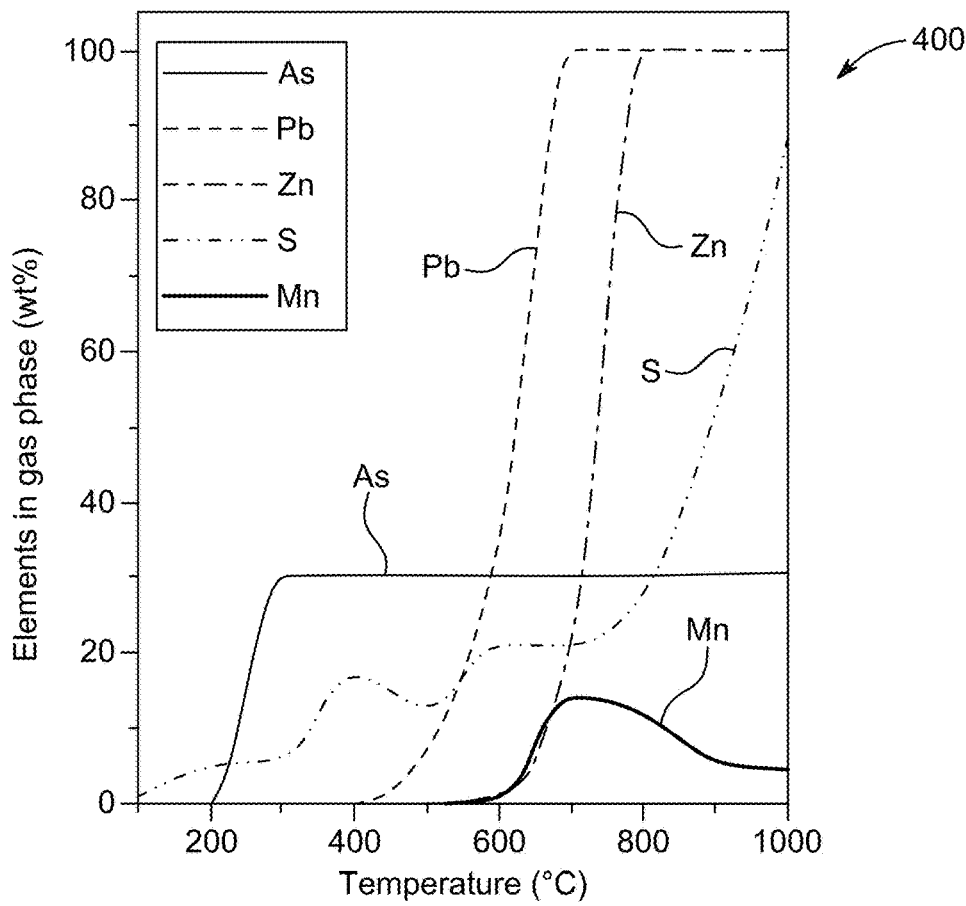
FIG. 4 is a line graph illustrating the changing weight percentage of certain elements in the gas phase based on operating temperatures during gasification processes, in accordance with embodiments of the present technology.

Additionally or alternatively, operation of the gasifier 320 can occur at relatively modest temperatures. For embodiments of the present technology, operating at these relatively lower temperatures (e.g., below 1000° C.) can limit the volatilization of undesirable contaminants including sulfur, chromium, and arsenic. This point can be explained with reference to FIG. 4, which is a line graph 400 illustrating the changing weight percentage of certain elements in the gas phase based on temperature for oxygen-blown gasification. As shown on the graph 400, arsenic starts to volatize at temperatures as low as 200° C., and reaches an equilibrium around 250° C. at which about 30% of elemental arsenic is volatized into the gas phase. As also shown on the graph 400, sulfur, which can form hydrogen sulfide ($H_2S$), volatizes at increasing rates starting at about 600° C., and increases significantly above 800° C. Stated differently, within a temperature range of 800-1000° C., the amount of sulfur entering the gas phase can triple, from about 30% at 800° C. to about 90% at 1000° C. In this regard, it is worth noting that gasification of cellulosic materials (e.g., wood) at lower temperatures can increase the risk of tarring by reducing the severity of the molecular decomposition of the gasification zone. Tars are aromatic and organic molecules, which would have to be broken down into carbon monoxide and hydrogen downstream of the gasifier 320 and filter vessel 330 (FIG. 3), e.g., in a tar cracking unit. Even small amounts of contaminants such as arsenic and sulfur can cause severe, irreversible damage to the current state of the art for tar-cracking catalysts. In view of the above, it can be generally desirable to operate the gasifier at as high a temperature as possible, while also limiting the volatilization of undesirable contaminants such as sulfur and arsenic. Accordingly, in some embodiments the gasifier 320 is operated at a temperature of no more than 950° C., 900° C., 850° C., 800° C., or 750° C., or within a range of 750-950° C., 750-900° C., 750-850° C., or 800-850° C. These operating temperatures are lower than typical hazardous waste gasifier operating temperatures, such as gasifiers operating at plasma conditions, which can run as hot as 2000° C., but do not have to consider the same levels of arsenic, chromium, sulfur, and other undesirable volatile toxic elements that are commonly found in C&D materials. As such, embodiments of the present technology are able to (i) receive and process a feed that is considered too hazardous to combust in traditional thermochemical systems and (ii) use a cooler gasification process. This approach to treating a feed is counterintuitive, as common industry practice to deal with more highly hazardous waste (e.g., chemicals) is to increase operating temperatures and thereby completely destroy the waste. By operating at cooler operating temperatures, embodiments of the present technology are able to reduce the capital and operating costs relative to traditional gasifier operations.

Referring again to FIG. 3, in some embodiments the system 300 can include an injection line 327 fluidically coupled to the outlet 324 of the gasifier 320, e.g., upstream of the filter vessel 330. The injection line 327 can be used to inject a capture material 325 to be mixed with the syngas and capture (e.g., adsorb to) heavy metal contaminants and remove them from the syngas stream. The capture material 325 can include one or more metal oxides, such as iron oxide, zinc oxide, nickel oxide, copper oxide, or other metal oxides configured to capture heavy metals (e.g., arsenic and/or chromium). Additionally or alternatively, the capture material 325 can include particles having a particle size of 250-400 mesh, 275-375 mesh, or 300-350 mesh. The capture material 325 can be sprayed (e.g., continuously or pulse-sprayed) into the gasifier outlet 324 in a direction parallel thereto and in a direction toward the filter vessel 335. In operation, the capture material 325, and heavy metal contaminants adsorbed thereto, can be trapped on the filter 335 of the filter vessel 330. Additionally, the capture material 325 and injection thereof may also contribute to sulfur removal. For example, arsene gas can bind with sulfur in the presence of the capture material 325 and thus be captured by the filter vessel 330 and/or filter 335. The capture material 325, contaminants, dust, and/or other materials can be pulse cleaned from the filter 335 periodically during continuous operation, e.g., every 0.5-5 hours. In some embodiments, the filter vessel 330 can include multiple filters 335 such that one filter can be cleaned with another filter 335 still in place.

In some embodiments, the capture material 325 is injected into the outlet of the gasifier 320 at room temperature, or a temperature between 50-150° F. or 70-110° F. In such embodiments, injection of the capture material 325 can cool the syngas stream exiting the gasifier head 322, e.g., to a temperature between 700-1000° F., 750-950° F. or 750-850° F. Doing so can cause more undesirable heavy metal contaminants to be captured by the downstream filter vessel 330 and/or in the fly ash from the filter vessel 330. In some embodiments, the capture material 325 and its injection, as described above, can reduce the undesirable contaminants by at least one order of magnitude.

As shown in FIG. 3, the system 300 includes a single capture material injection and a single filter. In some embodiments, the system 300 can include a second capture material injection downstream of the first filter, and a second filter downstream of the second capture material injection. This second injection and filter can further reduce the undesirable contaminants by another order of magnitude. Additionally, the second injection can further cool the syngas stream, e.g., to a temperature between 475-750° F. or 550-650° F. and thereby cause more undesirable heavy metal contaminants to condense and/or be captured.

III. Experimental Results

In view of the above description regarding optimization temperatures of the gasifier 320 (FIG. 3), tests were run at different operating temperatures to determine optimal conditions for both limiting volatilization of undesirable contaminants, and decreasing the risk of tarring. For some of these tests, Dolomite ($CaMg(CO_3)_2$ or about 54% $CaCO_3$ and 43% $MgCO_3$), Olivine ($(Mg,Fe)_2SiO_4$), Silica sand ($SiO_2$), and Limestone ($CaCO_3$) were also used as bed materials for the gasifier 320, in part because these materials have mineral compositions with a higher binding affinity for arsenic and/or other undesirable contaminants (e.g., chromium). The results of these tests are illustrated in FIGS. 5-7.

Figure 5:
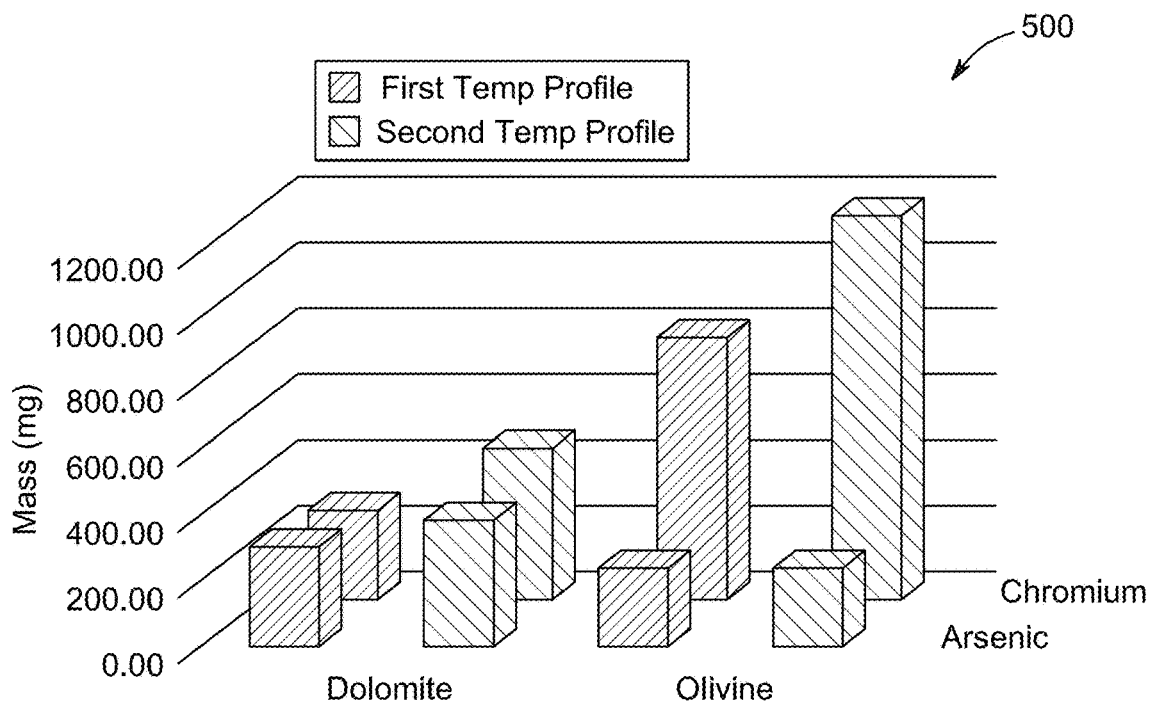
FIG. 5 is a bar graph illustrating the amount of arsenic and chromium captured in ash depending on different bed materials and operating temperatures, in accordance with embodiments of the present technology.

Referring first to FIG. 5, tests were conducted to determine the amount of arsenic and chromium captured in the ash using (i) select bed materials as listed above and (ii) operating the gasifier at a first "high" temperature of 950° C. and a second "low" temperature of 800° C. As shown in FIG. 5, with regard to arsenic, dolomite appeared to keep nearly a third more arsenic in the ash than olivine at either temperature. For both bed materials, the lower temperature setting sequestered more arsenic and chromium than the higher temperature setting. While it looks from these results that olivine appeared to keep the most chromium in the ash, mass balance calculations indicated that more chromium ended up being deposited in the ash than was present in the initial feed. It is also worth noting that at the lower temperature of 800° C., which optimized heavy metal sequestration, tarring was worse and tar deposits were visible to the naked eye inside the reactor. Such tar deposits did not occur at the higher temperature of 950° C.

Figure 6:
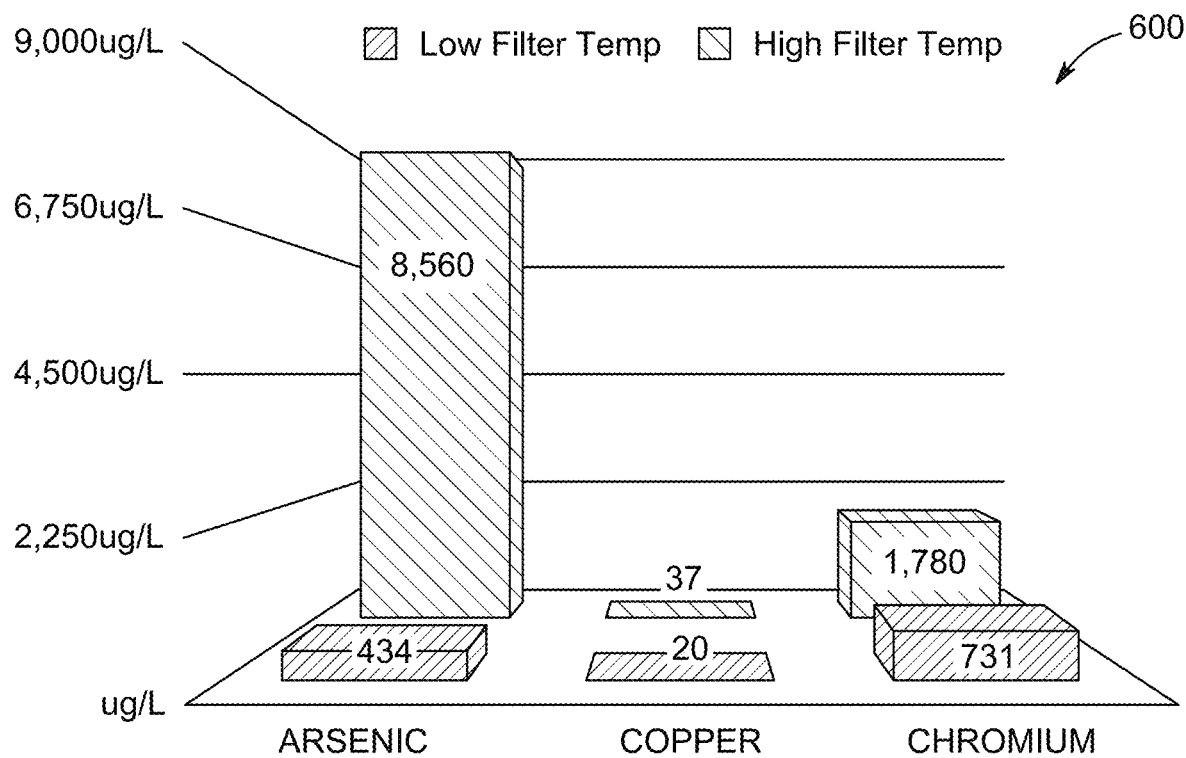
FIG. 6 is a bar graph illustrating the amount of arsenic, copper and chromium captured from syngas in condensate downstream of a filter vessel, depending on different operating temperatures, in accordance with embodiments of the present technology.

Referring next to FIG. 6, tests were conducted to determine the amount of contaminants, including arsenic, and chromium, that was captured from condensate in the condensation vessel 345 (FIG. 3), and thus not captured in the fly ash obtained via the filter vessel 330. These tests were run at different operating temperatures for the filter vessel 330, including a "low" filter temperature of approximately 420° F. and a "high" filter temperature of approximately 720° F. As expected and shown in FIG. 6, more of each contaminant was volatized and/or kept in the gas phase as the high filter temperature, and, accordingly, more of each contaminant was captured in the condensate from the condensation vessel 345 and not the fly ash from filter vessel 330. Stated differently, at higher temperatures, more of each contaminant passed through the filter and remained in the syngas, rather than being sequestered in the fly ash. For the low filter temperature, approximately 60% of the arsenic and chromium was sequestered in the fly ash from the filter vessel 330 and a majority of the balance of the arsenic and chromium was sequestered in the condensate from the condensation vessel 345. Since C&D waste includes CCA-treated lumber which introduces copper, chromium, and arsenic simultaneously, but copper is not a volatile heavy metal, copper results are included here as a control. As shown in FIG. 6, there was little to no difference in the change of copper captured via the condensate of condensation vessel 345 between the two filter temperatures.

Figure 7:
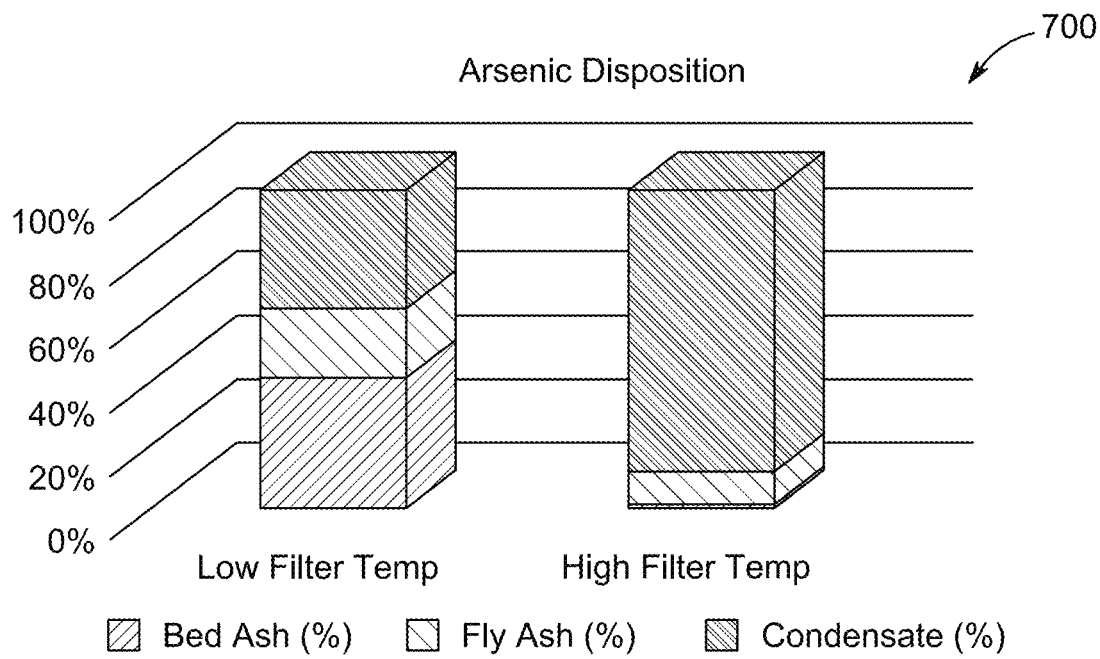
FIG. 7 is a bar graph illustrating the amount of arsenic captured in fly ash, bed ash, and condensate depending on different operating temperatures of a filter vessel, in accordance with embodiments of the present technology.

Referring next to FIG. 7, tests were conducted to determine the amount of arsenic that was captured from the condensate in the condensation vessel 345, from the fly ash in the filter vessel 330, and from the bed ash in the gasifier 320. These tests were run at the "low" filter temperature of approximately 420° F. and the "high" filter temperature of approximately 720° F., as described with reference to FIG. 6. At the high filter temperature, nearly 90% of the arsenic passed through the filter vessel 330 and ended up in the condensate of the condensation vessel 345, and just 1% ended up in the fly ash. This indicates that at the higher temperature, the arsenic volatilized into arsene gas and did not bind with other elements to be captured in the fly ash in the filter vessel 330. At the low filter temperature, less of the arsenic was volatized and thus more was captured in the bed ash from the gasifier 320. Additionally, for the arsenic that was volatized at the low filter temperature, more was captured in the fly ash from the filter vessel 330 relative to that captured for the high filter temperature. Capturing arsenic and other contaminants in the fly ash and bed ash is preferred to capturing such contaminants in the condensate of the condensation vessel 345, e.g., so that the condensate does not need to be disposed of as a hazardous waste.

FIG. 8 is a chart 800 illustrating compositions of the syngas product for experimental runs, in accordance with embodiments of the present technology. The chart 800 includes relative mole % for each of carbon monoxide (CO), water ($H_2O$), hydrogen sulfide ($H_2S$), hydrogen ($H_2$), carbon dioxide ($CO_2$), methane ($CH_4$), and other hydrocarbons ($C_xH_y$) for multiple experimental runs. Individual experimental runs include different compositions of the C&D feed that was gasified, and different operating conditions and additives.

IV. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "and/or" used in reference to a list of two or more items is to be interpreted as including (a) any single item in the list, (b) all of the items in the list, or (c) any combination of the items in the list. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. A method for gasifying construction and demolitions (C&D) materials, the method comprising:
   pre-processing construction and demolition (C&D) materials to produce a C&D feed, wherein the C&D feed comprises (i) treated wood and (ii) a composition including arsenic, chromium, and/or boron; and
   processing the C&D feed to produce a product gas, wherein processing the C&D feed comprises—
      reducing a size of the C&D feed;
      gasifying the size-reduced C&D feed, steam, and oxygen in a gasifier at a temperature of no more than 950° C. and/or a pressure of no more than 200 pounds per square inch (psi) to produce syngas;
      filtering the syngas from the gasifier to produce filtered syngas; and
      cooling the filtered syngas to produce a cooled syngas.

2. The method of any one of the clauses herein, wherein gasifying the size-reduced C&D feed, steam, and oxygen in the gasifier occurs at a temperature of no more than 950° C. and a pressure of no more than 200 psi.

3. The method of any one of the clauses herein, wherein filtering the syngas comprises filtering the syngas via a hot gas filter vessel and producing a fly ash comprising arsenic and/or chromium.

4. The method of any one of the clauses herein, further comprising removing condensate from the cooled syngas to produce the product gas.

5. The method of any one of the clauses herein, wherein processing the C&D feed further comprises producing a by-product comprising fly ash and/or bed ash, and wherein the by-product includes one or more of arsenic, boron, chromium, lead, sulfur, or copper.

6. The method of any one of the clauses herein, wherein the C&D feed includes a sulfur content of at least 3%.

7. The method of any one of the clauses herein, wherein the C&D feed comprises a particle size of 0.1-5 inches.

8. The method of any one of the clauses herein, wherein pre-processing the C&D materials comprises milling the C&D materials to produce a milled feed, and adding a bed sorbent comprising silica, dolomite, limestone, gypsum, and/or olivine to the milled feed to produce the C&D feed.

9. The method of any one of the clauses herein, wherein the C&D feed includes a sulfur content of at least 1%, and wherein the product gas comprises a hydrogen sulfide content of no more than 300 ppm.

10. The method of any one of the clauses herein, wherein a concentration of the arsenic, chromium, and/or boron of the C&D feed is at least 10 mg/kg.

11. A system for gasifying construction and demolition materials, the system comprising:
   an inlet configured to receive a construction and demolition (C&D) feed comprising treated wood, chromated copper arsenate (CCA) wood, borate-treated materials, and/or resinated wood;
   a gasifier fluidically coupled to the inlet and positioned to receive the C&D feed at an intermediate portion of the gasifier, the gasifier comprising a lower portion configured to receive steam and oxygen and an upper portion including a gasifier head, wherein the gasifier is configured to operate at a temperature of no more than 950° C. and/or a pressure of no more than 200 pounds per square inch (psi) to produce syngas at the gasifier head; and
   a filter fluidically coupled to an outlet of the gasifier and configured to remove heavy metals from the produced syngas.

12. The system of any one of the clauses herein, further comprising a filter vessel containing the filter and positioned to receive the produced syngas from the gasifier head, wherein, in operation, the filter removes heavy metals including chromium, boron, and/or arsenic from the produced syngas and produces fly ash comprising at least a portion of the removed heavy metals.

13. The system of any one of the clauses herein, wherein the gasifier is configured to produce a bed ash comprising arsenic, chromium, lead, boron, and/or sulfur.

14. The system of any one of the clauses herein, wherein the gasifier is configured to operate at a temperature of no more than 800° C.

15. The system of clause 14, wherein the gasifier is configured to operate at a pressure of no more than 200 psi.

16. The system of any one of the clauses herein, further comprising:
   a heat exchanger downstream of and fluidically coupled to an outlet of the filter, wherein the heat exchanger is configured to cool the outlet from the filter to produce cooled syngas; and a condensation vessel downstream of and fluidically coupled to an outlet of the heat exchanger, wherein the condensation vessel is configured to separate condensate from the cooled syngas and produce a product gas.

17. The system of any one of the clauses herein, further comprising a source of capture material fluidically coupled to an outlet of the gasifier and upstream of the filter, wherein the capture material comprises a metal oxide and is configured to be mixed with the outlet of the gasifier to react with and precipitate volatile heavy metals out of the syngas.

18. The system of any one of the clauses herein, wherein the C&D feed includes a bed sorbent comprising dolomite, limestone, silica, gypsum, calcium, and/or olivine.

19. The system of any one of the clauses herein, wherein the C&D feed includes a sulfur content of 1-6%.

20. A system for gasifying construction and demolitions materials, the system comprising:
- an inlet configured to receive a C&D feed comprising (i) a composition including arsenic, chromium, and/or boron, and (ii) at least two of untreated wood, treated wood, paper and cardboard, yard waste, plastic, rubber, or foam;
- a gasifier fluidically coupled to the inlet and positioned to receive the C&D feed at a first portion of the gasifier, the gasifier further comprising a second portion spaced apart from the first portion in a first direction, and a third portion spaced apart from the first portion in a second direction opposite the first direction, wherein the second portion is configured to receive steam and oxygen and the third portion includes a gasifier head, wherein the gasifier is configured to operate at a temperature of no more than 950° C. and a pressure of no more than 200 pounds per square inch (psi) to produce syngas at the gasifier head, wherein the gasifier is configured to produce a first ash comprising arsenic, chromium, boron, and/or sulfur; and
- a filter vessel comprising a filter fluidically coupled to an outlet of the gasifier and configured to remove heavy metals from the produced syngas, wherein the filter vessel is positioned to receive the produced syngas from the gasifier head, and wherein, in operation, the filter vessel removes heavy metals from the produced syngas and produces a second ash comprising at least some of the removed heavy metals.

We claim:

1. A system for gasifying construction and demolition materials, the system comprising:
- a source of C&D feed comprising chromated copper arsenate (CCA) wood, borate-treated materials, and/or resinated wood;
- an inlet portion including a solids feed hopper configured to receive the C&D feed, and a rotatable feeder downstream of the solids feed hopper, wherein the rotatable feeder includes an inlet end and an opposing outlet end and is configured to transport the C&D feed away from the inlet end and toward the outlet end;
- a gasifier fluidically coupled to the outlet end of the rotatable feeder and positioned to receive the C&D feed at an intermediate portion of the gasifier, the gasifier comprising a lower portion configured to receive steam and oxygen and an upper portion including a gasifier head, wherein the gasifier includes only (i) a first inlet configured to receive the steam and oxygen and (ii) a second inlet configured to receive the C&D feed, and wherein the gasifier is configured to operate at a temperature of no more than 950° C. and/or a pressure of no more than 200 pounds per square inch (psi) to produce syngas at the gasifier head;
- a source of capture material fluidically coupled to an outlet of the gasifier, wherein the capture material comprises particles having a particle size of 250-400 mesh; and
- a filter fluidically coupled to an outlet of the gasifier and positioned to receive the syngas, wherein the filter is configured to remove undesirable contaminants from the syngas and produce an ash comprising chromium, arsenic and/or boron, and wherein the source of capture material is fluidically coupled to the outlet of the gasifier upstream of the filter.

2. The system of claim 1, further comprising a filter vessel containing the filter and positioned to receive the syngas from the gasifier head, wherein the ash is a fly ash comprising chromium, arsenic and boron.

3. The system of claim 2, wherein the gasifier is configured to produce a bed ash comprising arsenic, chromium, lead, boron, and/or sulfur.

4. The system of claim 1, wherein the gasifier is configured to operate at a temperature of no more than 800° C.

5. The system of claim 4, wherein the gasifier is configured to operate at a pressure of no more than 200 psi.

6. The system of claim 1, further comprising:
- a heat exchanger downstream of and fluidically coupled to an outlet of the filter, wherein the heat exchanger is configured to cool the outlet from the filter to produce cooled syngas; and
- a condensation vessel downstream of and fluidically coupled to an outlet of the heat exchanger, wherein the condensation vessel is configured to separate condensate from the cooled syngas and produce a product gas.

7. The system of claim 1, further comprising a source of capture material fluidically coupled to an outlet of the gasifier upstream of the filter, wherein the capture material comprises a metal oxide and is configured to be mixed with the outlet of the gasifier to react with and precipitate volatile heavy metals out of the syngas.

8. The system of claim 1, wherein the C&D feed includes a bed sorbent comprising dolomite, limestone, silica, gypsum, calcium, and/or olivine.

9. The system of claim 1, wherein the C&D feed includes a sulfur content of 1-6%.

10. A system for gasifying construction and demolitions materials, the system comprising:
- a source of C&D feed (i) a composition including arsenic, chromium, and/or boron, and (ii) at least two of untreated wood, treated wood, paper, cardboard, yard waste, plastic, rubber, or foam;
- an inlet portion including a solids feed hopper configured to receive the C&D feed, and a rotatable feeder positioned to receive the C&D feed from the solids feed hopper, wherein the rotatable feeder includes an inlet end and an opposing outlet end and is configured to transport the C&D feed away from the inlet end and toward the outlet end;
- a gasifier fluidically coupled to the inlet portion and positioned to receive the C&D feed from the outlet end of the rotatable feeder at a first portion of the gasifier, the gasifier further comprising a second portion spaced apart from the first portion in a first direction, and a third portion spaced apart from the first portion in a second direction opposite the first direction, wherein:
    the second portion is configured to receive steam and oxygen and the third portion includes a gasifier head, the gasifier includes only (i) a first inlet configured to receive the steam and oxygen and (ii) a second inlet configured to receive the C&D feed, the gasifier is configured to operate at a temperature of no more than 950° C. and a pressure of no more than 200 pounds per square inch (psi) to produce syngas at the gasifier head, and the gasifier is configured to produce a first ash comprising arsenic, chromium, boron, and/or sulfur;

a source of capture material fluidically couple an outlet of the gasifier, wherein the capture material comprises particles having a particle size of 250-400 mesh; and a filter vessel comprising a filter fluidically coupled to an outlet of the gasifier and configured to remove heavy metals from the produced syngas, wherein the filter vessel is positioned to receive the produced syngas from the gasifier head, wherein the source of material is upstream of the filter, and wherein, in operation, the filter vessel removes heavy metals from the produced syngas and produces a second ash comprising at least some of the removed heavy metals.

11. The system of claim 10, wherein the filter is directly fluidically coupled to the outlet of the gasifier, and wherein the filter is positioned entirely within the filter vessel.

12. The system of claim 1, wherein the C&D feed comprises borate-treated materials.

13. The system of claim 1, further comprising:
a filter vessel positioned to receive the syngas from the gasifier head, the filter vessel comprising:
the filter contained entirely within the filter vessel, and
a filter vessel outlet fluidically coupled directly to the filter, such that all fluid flowing through the filter vessel outlet passes through the filter.

14. The system of claim 1, wherein the source of C&D feed includes gypsum.

15. A system for gasifying construction and demolition materials, the system comprising:
a source of C&D feed comprising chromated copper arsenate (CCA) wood, borate-treated materials, and/or resinated wood;

an inlet portion including a solids feed hopper configured to receive the C&D feed, and a rotatable feeder downstream of the solids feed hopper, wherein the rotatable feeder includes an inlet end and an opposing outlet end and is configured to transport the C&D feed away from the inlet end and toward the outlet end;

a gasifier fluidically coupled to the outlet end of the rotatable feeder and positioned to receive the C&D feed at an intermediate portion of the gasifier, the gasifier comprising a lower portion configured to receive steam and oxygen and an upper portion including a gasifier head, wherein the gasifier includes only (i) a first inlet configured to receive the steam and oxygen and (ii) a second inlet configured to receive the C&D feed;

a source of capture material fluidically coupled to an outlet of the gasifier, wherein the capture material comprises particles having a particle size of 250-400 mesh; and a filter fluidically coupled to an outlet of the gasifier and positioned to receive the syngas, wherein the filter is configured to remove undesirable contaminants from the syngas and produce an ash comprising chromium, arsenic and/or boron, and wherein the source of capture material is upstream of the filter.

* * * * *